April 12, 1966 D. L. McKAY 3,245,536
VACUUM FILTRATION
Filed March 25, 1963 3 Sheets-Sheet 3

INVENTOR.
D. L. MC KAY
BY
*Young and Quigg*
ATTORNEYS

United States Patent Office 3,245,536
Patented Apr. 12, 1966

3,245,536
VACUUM FILTRATION
Dwight L. McKay, Bartlesville, Okla., assignor to Phillips Petroleum Company, a corporation of Delaware
Filed Mar. 25, 1963, Ser. No. 267,584
8 Claims. (Cl. 210—77)

This application relates to vacuum filtration. In one aspect this invention relates to improved methods for carrying out vacuum filtration operations. In another aspect this invention relates to improved apparatus for carrying out vacuum filtration operations.

Filtration is the separation of solid material from non-solid material and is effected by passing a fluid having the solid material suspended or otherwise dispersed therein through a filter medium which retains the solid material and allows the fluid non-solid material to pass therethrough. One of the most common filtration operations involves the separation of solids from liquids. Various filtering systems have been devised for this particular operation. Systems employing rotary vacuum filters have been found effective for many filtering operations and are widely used where continuous operation is desirable.

A rotary vacuum filter comprises a filter drum rotatably mounted in a casing or housing. A vacuum is maintained within said drum and a positive pressure is maintained in the region within said housing surrounding said drum. The filter drum rotates in a slurry of solid material in a liquid supplied to the lower portion of said casing or housing. As the filter drum is rotated, the vacuum within said drum causes the liquid to pass through the filter medium (which comprises the surface of the drum) and into the interior of said drum. As the surface of the drum rotates out of the liquid, gases pass through the filter cake formed on the surface of the filter medium and the cake is "dried." Upon continued rotation the drum passes the point of cake removal. In some filters the cake is removed by scraping, and in others by supplying blow-back gas to a section of the inner surface of the drum to blow the cake therefrom. The removed filter cake can then be further processed as desired.

The mother liquor and gases which are removed from the interior of the filter drum are separated and the mother liquor processed as desired. Said gases are usually returned to the filter housing or casing where they are employed to maintain, or aid in maintaining, said housing or casing under a small positive pressure which aids in the filter operation. When the filtering system is being operated at low temperatures, as in fractional crystallization processes, it is particularly desirable to return said gases to the filter casing or housing and to operate the system as a closed system so as to maintain a high thermal efficiency. This recycling of the vacuum gases or vapors, while necessary, contributes to and aggravates the problems which the present invention solves.

As mentioned above, the filter casing or housing is maintained under a small positive pressure. This prevents leakage of external air into the region of the housing which surrounds the filter drum. However, since the interior of the filter drum is under a vacuum, care must be taken to prevent the entrance of external air into this portion of the system. Even though the air leak may be small, the concentration of oxygen within the filter housing and gas recycling system will build up. When the mother liquor comprises a hydrocarbon, or other liquid the vapors of which will form an explosive mixture with oxygen, leakage of air into the system can form an explosive mixture in the filter housing. Explosions of such mixtures in filter housings have occurred with resulting serious damage. Furthermore, air which leaks into the system contains moisture which tends to freeze on the surface of the filter medium and plug same.

One of the most common locations of leaks in a rotary vacuum filter is along the shaft around which the filter drum revolves. In many rotary vacuum filters a packing assembly disposed around the shaft is relied upon to seal the interior of the filter drum from the atmosphere and prevent leakage of air into said drum. These packing assemblies are an almost constant source of trouble, particularly in those systems where air must be excluded. Sooner or later a leak will develop, even with the most careful maintenance. The result is expensive maintenance at least and the presence of a constant hazard with sometimes costly consequences as when an explosion does occur.

The present invention provides a method and apparatus for overcoming the above-described difficulties. Broadly speaking, the invention provides a method and apparatus for introducing gas from the filter housing under super-atmospheric pressure into an intermediate point of the packing assembly disposed around the shaft about which the filter drum revolves. Thus, if any leakage occurs in or through said packing assembly and along said shaft into the interior of the filter drum, the gas leaked will be of the same composition as that contained in the filter housing, and external air is effectively excluded.

An object of this invention is to provide an improved method for carrying out vacuum filtering operations. Another object of this invention is to provide an improved apparatus for carrying out vacuum filtering operations. Another object of this invention is to prevent leakage of air into the interior of the filter drum in a rotary vacuum filter. Another object of this invention is to provide an improved rotary vacuum filter which includes means for preventing leakage of air into the interior of the filter drum of said filter. Still another object of this invention is to provide an improved rotary filter which is provided with means for introducing gas from within the housing of said filter into the packing assembly disposed around the shaft about which the filter drum rotates. Other aspects, objects, and advantages of the invention will be apparent to those skilled in the art in view of this disclosure.

Figure 1:
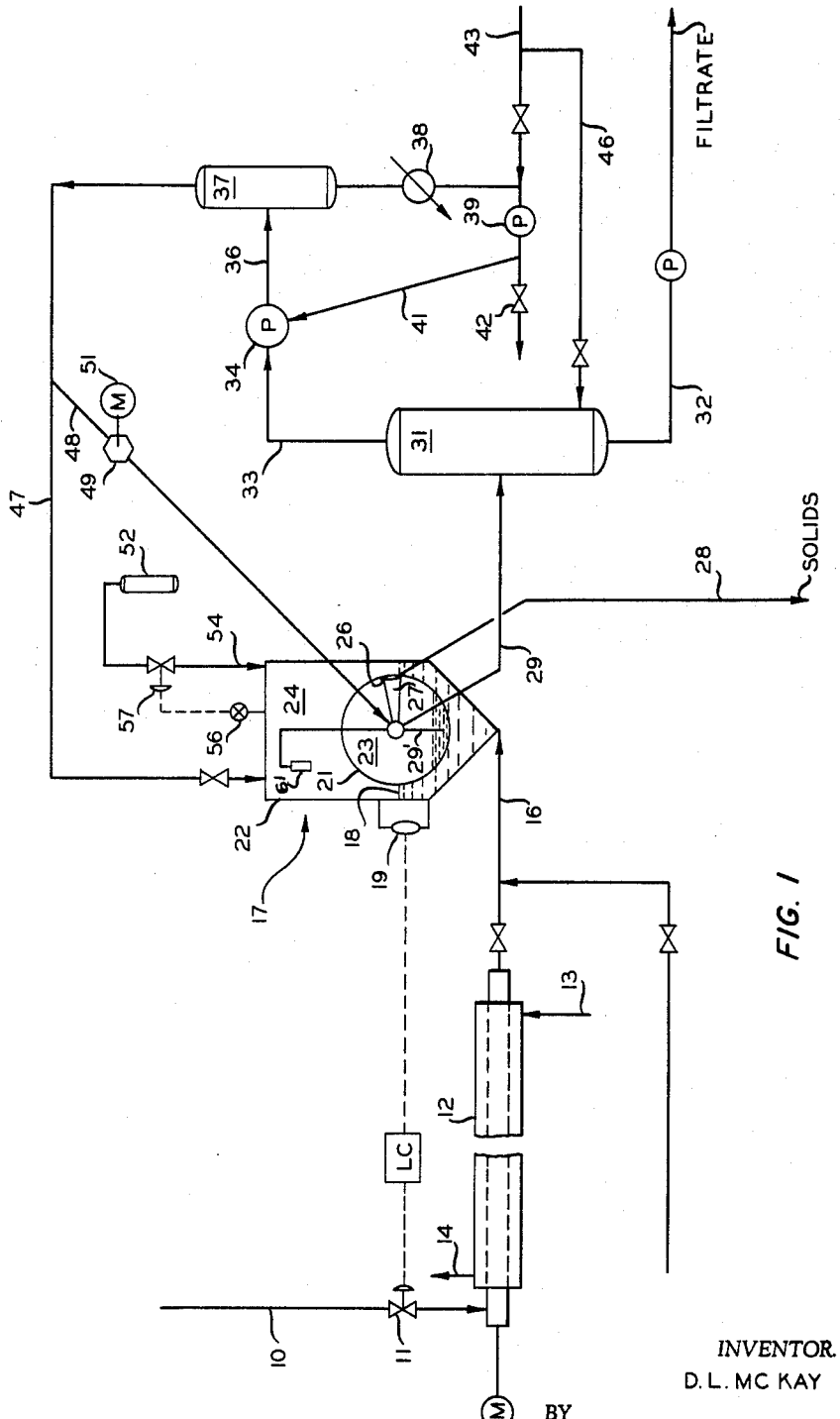
FIGURE 1 is a diagrammatic flow sheet illustrating a vacuum filtering operation in accordance with the invention.

Referring now to said drawings, wherein like reference numerals are employed to denote like elements, the invention will be more fully explained as applied in a process for the fractional crystallization of para-xylene. In FIGURE 1, a mixture of materials from which at least one constituent is to be separated is passed through conduit 10, control valve 11, and into a scraped surface chiller 12. The temperature of the feed mixture in chiller 12 is adjusted so as to obtain crystals of at least a portion of at least one of the constituents of the mixture. Chiller 12 can be any conventional type chiller which is supplied with refrigeration means adequate to adjust the temperature of the mixture to that necessary to obtain crystals of at least a portion of at least one of the constituents thereof. The temperature to which the mixture is adjusted in chiller 12 depends entirely upon the specific feed mixture, since the various materials in the feed will have different solidification points and since the solidification point of any given constituent of the feed mixture is dependent upon the composition of said feed mixture. When, for example, a mixture of isomeric $C_8$ alkyl benzenes is fed through conduit 10 to chiller 12, the temperature of the mixture is lowered to a temperature in the range of about −57 to about −78° C. When the desired component of the feed mixture is relatively dilute in the feed mixture, the temperature at which the crystals will form will be relatively low. If the desired component is relatively concentrated in the feed mixture, the temperature at which crystals thereof will form will be relatively high. A cooling medium is passed through a jacket in the wall of chiller 12 via conduit 13 and conduit 14 to accomplish the aforesaid adjustment of the temperature of the feed mixture.

The resulting slurry of crystals is passed via conduit 16 into a rotary vacuum filter 17 wherein the non-crystalline material is separated from the crystals. Conduit 16 is preferably very short and in most instances the outlet of chiller 12 is connected directly to filter 17 to reduce insulation costs and conserve refrigeration. A constant level 18 of the crystal slurry is maintained in the lower portion of filter 17 by means of level sensing device 19 which in turn controls the operation of valve 11 and the rate at which the feed mixture is introduced into chiller 12. Said slurry level 18 can, of course, be maintained by hand control or any other suitable arrangement of automatic controls. In some systems, particularly in non-refrigerated systems, level 18 is maintained by means of an overflow pipe which returns the excess slurry to a surge tank from which the feed in conduit 16 is pumped.

Filter 17 comprises a rotating drum 21 which is surrounded by a housing 22. Said drum 21 is partially immersed in the slurry of crystals which is maintained in the lower portion of housing 22 as described above. The interior 23 of said drum is maintained under a suitable vacuum, usually in the order of 10 to 20 inches of mercury, by means described hereinafter. The region 24 within housing 22 and surrounding drum 21 is maintained under a suitable positive pressure, generally within the range of 0.5 to 40 inches of water, more usually within the range of 5 to 15 inches of water. During operation of the filter said drum 21 is rotated by means not shown and mother liquor passes through the filter medium which comprises the surface of said drum and into the interior of said drum due to the lower pressure therein, and a cake of crystals builds up on said filter medium. As the surface of the drum rotates out of the slurry of liquids, gases are pulled through the filter medium to "dry" the cake on the surface of the drum. As the surface of the drum passes over shoe 26 attached to blow-back device 27, a pulsing gas pressure, supplied by means described hereinafter and directed in the opposite direction to the passage of mother liquor through the filter medium in forming the filter cake, is applied to the underside of said drum surface so as to remove the filter cake. Said filter cake is passed via conduit 28 to further processing as desired. When the filter cake comprises para-xylene as here described, it is passed to a crystal purification zone such as that described in Patent 2,921,682, issued January 19, 1960, to D. H. White. The above-referred-to filter medium can be any suitable material such as cloth, paper, glass fabric, felt, synthetic fabrics, perforated or porous metal, or any combination of said materials or other filter media which will effectively retain solids while permitting liquid to pass therethrough in a filtering operation.

Vacuum is applied to the interior of drum 21 and filtrate and vapors are withdrawn from the filter via conduit 29 and induction conduit 29' which dips into the body of filtrate within said drum 21. Said filtrate and vapors are passed into liquid-vapor separator 31 wherein they are separated and filtrate or mother liquor is removed via conduit 32 for further processing or storage as desired. Vapors are removed from vapor-liquid separator 31 via conduit 33 by means of vacuum pump 34 and are passed via conduit 36 into knockout drum 37. Liquid is withdrawn from the bottom of knockout drum 37 through cooler 38 and passed by means of pump 39 and conduit 41 into said vacuum pump 34 as sealing liquid therefor. Excess sealing liquid can be withdrawn from the system via conduit 42 as desired. A sealing liquid is necessary in the operation of vacuum pump 34. Thus, when the system is first being started, it will be necessary to supply a small amount of sealing liquid to pump 39 via conduit 43. This seal liquid can conveniently be liquid of about the same composition as the filtrate to be recovered in the system. It will usually also be desirable to have a level of liquid in the bottom of vapor liquid separator 31 upon start-up of the unit. This liquid can also be supplied from conduit 43 via conduit 46.

Gases or vapors are passed from knockout drum 37 via conduit 47 to housing 22 of filter 17. A portion of the gases in conduit 47 are passed via conduit 48 and pulse valve 49, powered by motor 51, into blow-back device 27 of filter drum 21. Said pulse valve 49 can conveniently be a star valve or any other device which will provide a pulsating flow of gas or vapor to blow-back device 27. Shoe 26 provides a seal between the blow-back device 27 and the inner surface of drum 21 so as to direct the flow of gas or vapor through the wall of drum 21 at the desired point.

A source 52 of inert gas, such as nitrogen or carbon dioxide, is connected to the housing 22 of filter 17 by means of conduit 54 and is employed as make-up gas to maintain the desired pressure within said housing 22. Pressure sensing device and transmitter 56 operatively controls motor valve 57 in conduit 54 to maintain the desired pressure within said housing 22.

Filter 17 is a Bird-Young continuous vacuum filter which has been modified in accordance with the invention. The general structure of said filter is as indicated in the drawings. However, the piping of said filters can be varied to fit specific filtering operations. For example, T connection 70 (see FIGURE 2) is provided to serve as an alternate blow-back connection if desired. Also, in some filters provision is made for supplying wash liquid to the surface of the cake on drum 21 and removing the wash liquid through an internal pipe mounted within shaft conduit 67 and extending out through T 70. It will be understood that it is within the scope of the invention to employ such filters in the practice of the invention. Further details regarding the construction and operation of said Bird-Young filters can be found on page 983 of Perry, "Chemical Engineer's Handbook," Third Edition, McGraw-Hill Book Company, Inc., New York (1950).

In the operation of a system such as that illustrated in FIGURE 1 in the absence of the invention, it has been found that the concentration of oxygen can and frequently does build up to where an explosive mixture exists in the region 24 surrounding filter drum 21. In at least one instance an explosion has occurred due to the presence of said explosive mixture. The present invention provides a means and method for preventing the occurrence of an explosive mixture in filter 17 by introducing a stream of gas from housing 22 into the packing assemblies surrounding the shaft about which filter drum 21 rotates. Thus, referring to FIGURE 2, in accordance with the invention there is provided a pair of bubble pots 61 which are suitably mounted by means not shown on opposite exterior walls of housing 22. A pair of first conduits 62 are provided, each extending from said housing to within one of said bubble pots 61 to a point below the level 63 of a scrub liquid contained in said bubble pot. A pair of second conduits 64 are provided, each extending in communication between one of said bubble pots and one of the packing assemblies 66 which are disposed around the outwardly extending portions of the conduit shaft 67 which extends through housing 22. The scrub liquid in bubble pots 61 can be any suitable liquid which is inert to the gases or vapors in housing 22 and the materials being passed through filter 17. Light lubricating oils are presently preferred. However, other suitable hydrocarbons such as kerosene and naphthas can also be used. Said scrub liquids should also be compatible with packing materials 73 (see FIGURE 3) and 73'.

Figure 2:
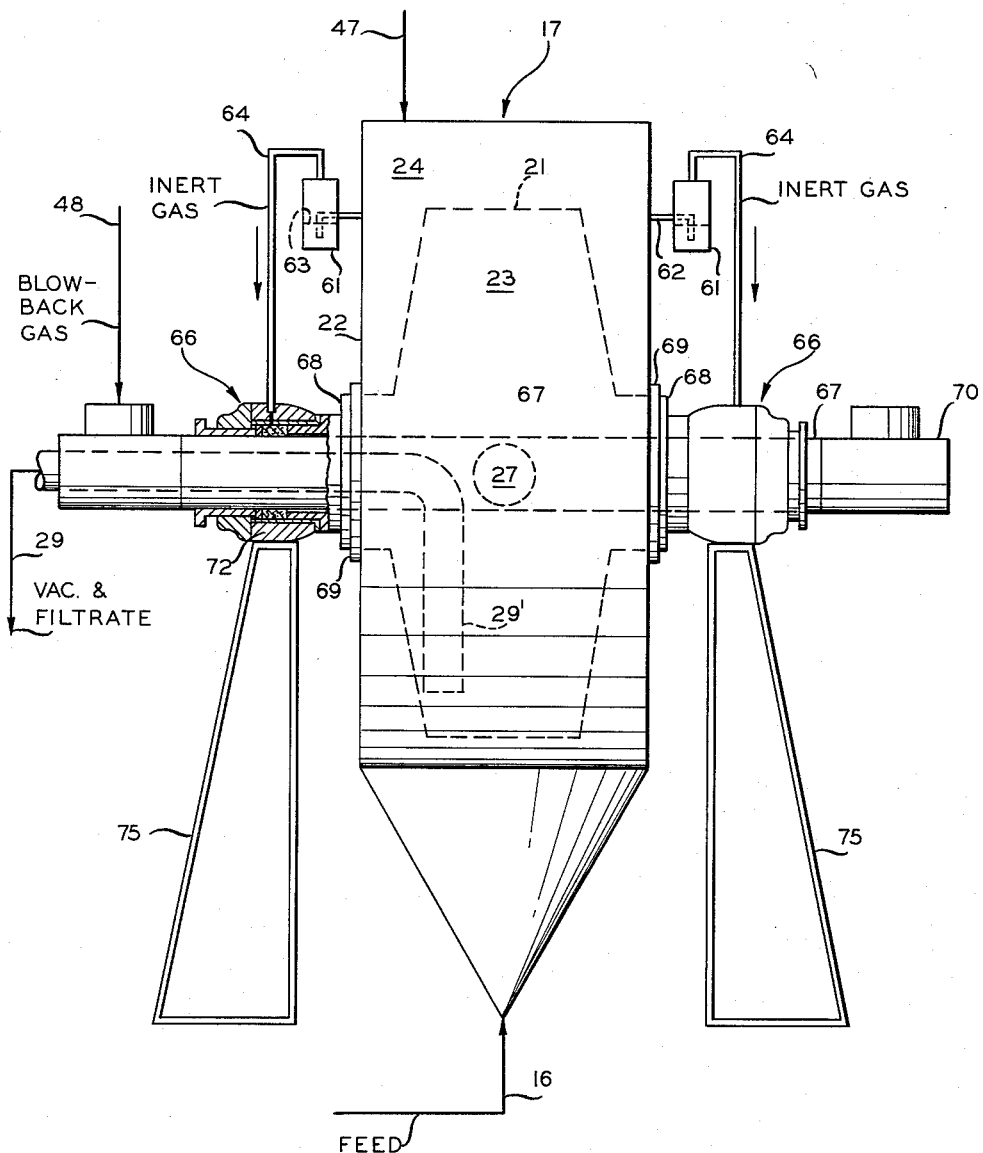
FIGURE 2 is a schematic representation of a rotary vacuum filter, such as employed in the process illustrated in FIGURE 1, and which has been modified in accordance with the invention.
Figure 3:
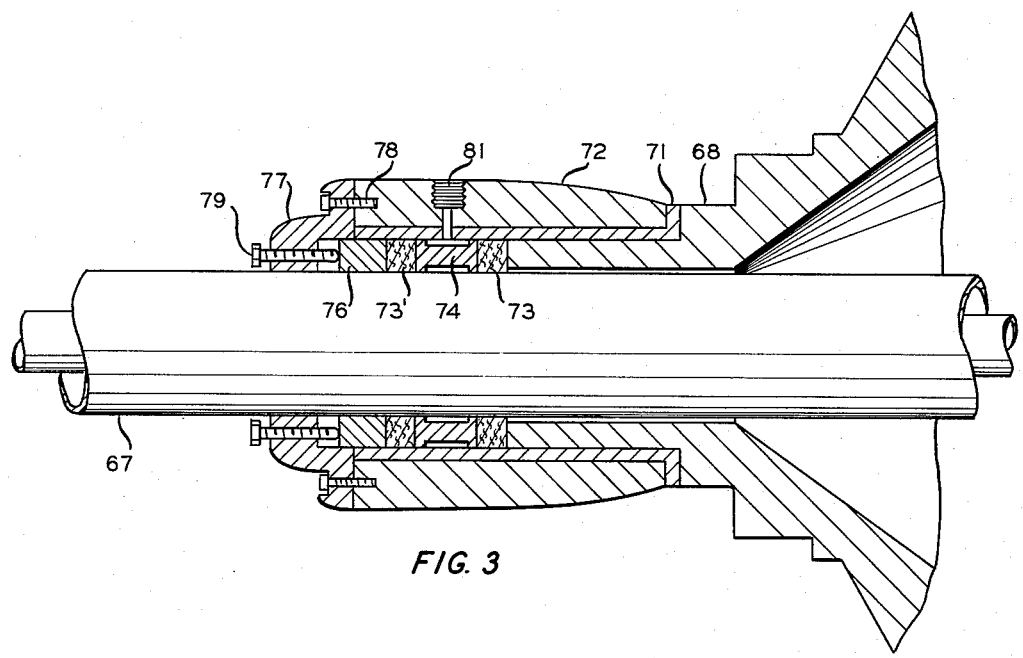
FIGURE 3 is a detailed view, partly in cross-section, of one modification of a packing assembly which can be employed on the rotary filter of FIGURE 2 in accordance with the invention.

Referring now to FIGURE 3, there is illustrated one type of packing assembly 66 (see FIGURE 2) which can be employed in the practice of the invention. In FIGURES 2 and 3 it will be noted that filter drum 21 is provided with a pair of opposite outwardly extending trunnions 68 which extend through opposite side walls of said housing 22. A suitable sealing means 69 (see FIGURE 2) is provided between said walls of housing 22 and said trunnions 68 of filter drum 21. Said trunnions 68 rest in and rotate in bearing 71. Each of said packing assemblies 66 comprises a pillow block 72 adapted to fit with and support bearing 71. Pillow blocks 72 are supported by means of supports 75. It will be understood that conduit shaft 67 and the associated conduits connected thereto are independently supported by suitable means not shown. If desired, said pillow block 72 and bearing 71 can be fabricated integrally with the inner face of pillow block 72 being of bearing metal and furnishing the bearing surface in which trunnions 68 rotate. Positioned within the cavity formed between bearing 71 and conduit shaft 67 are first and second rings of packing material 73 and 73'. Said rings of packing material are separated by an intermediate lantern ring 74. While only two packing rings 73 and 73' are shown, it will be understood that more than two of such rings can be employed so long as at least one lantern ring 74 is provided between a ring 73 and a ring 73'. Exteriorly of the second packing ring 73' there is provided a follower ring 76. Said follower ring can be of any suitable type of metal. A clamp ring 77 is provided at the outboard end of each of said packing assemblies 66 and is attached and held to the pillow blocks 72 by means of threaded bolts 78 as shown. Bolts 79 are provided to adjust the pressure on packing rings 73', 73 and lantern ring 74. Threaded connection 81 is provided to receive one end of a conduit 64 to complete the communication between bubble pots 61 and lantern ring 74 for introduction of gas from within housing 22 into an intermediate point of said packing assembly.

Figure 4:
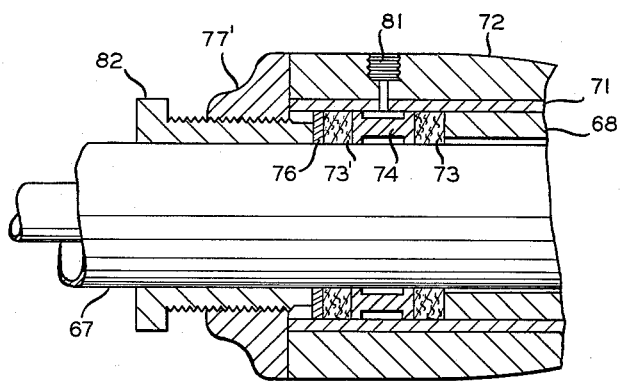
FIGURE 4 is a detailed view, partly in cross-section, of another packing assembly which can be employed on the rotary filter of FIGURE 2 in accordance with the invention.

The packing assembly illustrated in FIGURE 4 is like that illustrated in FIGURE 3 except that a threaded gland 82 threadedly engages clamp ring 77' and provides means for adjusting the pressure on packing rings 73', 73 and lantern ring 74. Bolts 78 are not shown in FIGURE 4 for simplicity.

The following examples will serve to further illustrate the invention.

*Example I*

This example is representative of the filtering operation whch was in progress at the time the explosion referred to above occurred.

A composite feed comprising 22.1 weight percent para-xylene, 16.3 weight percent ortho-xylene, 31 weight percent meta-xylene, 26.2 weight percent ethyl benzene and 4.4 weight percent toluene in an amount of 1165 gallons per hour is passed through chiller 12 wherein it is cooled to a temperature of $-76°$ C. with the resultant formation of 15.1 weight percent crystalline solids. The slurry of mother liquor and crystals is passed to filter 17 wherein mother liquor having a para-xylene content of 6.75 weight percent, and gases, are removed at a rate of 890 gallons per hour through conduits 29 and 29' and passed into vapor-liquid separator 31. Said mother liquor and gases are moved into vapor-liquid separator 31 through application of a vacuum equivalent to about 20 inches of mercury by means of vacuum pump 34. Said vacuum pump discharges gases into knockout drum 37 at a positive pressure equal to about 15 inches of water. Said gases are returned via conduit 47 to housing 22 of filter 17. A portion of said gases are passed via conduit 48 and pulse valve 49 into blow-back device 27 to aid in removing cake from the exterior of drum 21. Blow-back pressure in device 27 is maintained at about 10 inches of water. The crystal material removed from the surface of drum 21 is about 70 percent solids and comprises about 65 to 75 weight percent para-xylene. Said crystal material is passed via conduit 28 to a crystal purification column, such as that described in said White Patent 2,921,682 where it is further purified to recover a product of 99 weight percent pure para-xylene.

During the above-described operation the concentration of oxygen in the region 24 of filter 17 increased to within explosive mixture limits and the operation was terminated by an explosion in filter 17.

*Example II*

After the explosion terminated the operation described above in Example I, the means in accordance with the invention for introducing gas from region 24 of filter 17 into the intermediate point of the packing assembly 66 were installed. Since that time the system has operated without build up of oxygen within said region 24 and without further mishap due to the leakage of air into the filter.

From the above examples it is evident that the invention provides a marked improvement, both in the method and apparatus for carrying out vacuum filtering operations. The invention provides a method and means for introducing a sealing gas under positive pressure at all times into an intermediate point of the packing assemblies which seals the interior of the filter drum from exterior air. Said sealing gas is supplied to said packing assemblies on a demand basis and flow thereof is not restricted. Furthermore, the gas supplied is a clean gas by virtue of having been bubbled through the scrubbing liquid, such as any suitable light weight lubricating oil, wherein any entrained solids or other impurities are removed. Any resulting entrainment of lubricating oil which is entrained in and passes with the gases in conduit 64 is advantageous since it serves to lubricate packing rings 73 and 73'.

While the invention has been described as employed in a vacuum filtering operation as applied to a fractional crystallization process, application of the invention is not so limited. The invention is applicable to any vacuum filtering operation wherein build-up of oxygen in the filtering system must be avoided. For example, vacuum filtering techniques employing rotary vacuum filters can be employed in separating solid polymer from the reactor effluent in polymerization processes. An example of such a vacuum filtering operation is described in my Patent 3,029,948, issued April 17, 1962. When such vacuum filtering techniques which do not require refrigeration are employed the slurry or other material to be filtered can be introduced into conduit 16 downstream of chiller 12 by means of conduit 10' as shown in FIGURE 1. In such instances level control device 19 can be operatively connected to valve 11' in said conduit 10'. Thus, the invention can be employed in any vacuum filtering operation wherein build-up of oxygen in the hydrocarbon gases present in the region 24 within housing 22 must be avoided; for example, the hydrocarbon systems described in column 4 of said White Patent 2,921,682.

While certain embodiments of the invention have been described for illustrative purposes, the invention obviously is not limited thereto. Various other modifications will be apparent to those skilled in the art in view of this disclosure. Such modifications are within the spirit and scope of the invention.

I claim:
1. In a rotary vacuum filtering apparatus, said apparatus comprising an essentially fluid-tight closed housing, a shaft extending into said housing, a vacuum filter drum rotatably mounted within said housing around said shaft, means for maintaining said housing under superatmospheric pressure, means for maintaining the region within said drum under vacuum, and a packing assembly disposed around said shaft, the improvement of: means for supplying gas under superatmospheric pressure from within said housing into said packing assembly at an intermediate point thereof so as to prevent leakage of external air through said packing assembly and along said shaft into the interior of said drum.

2. In a rotary vacuum filtering apparatus for separating solid material from non-solid material, said apparatus comprising an essentially fluid-tight closed housing, a rotating filter drum mounted within said housing around a shaft which extends outward through a wall of said housing, a packing assembly disposed around said extended portion of said shaft, means for maintaining the region within said drum under vacuum, and means for maintaining the region within said housing and surrounding the exterior of said drum filled with a gas under superatmospheric pressure, the improvement of: means for supplying gas from within said housing into said packing assembly at an intermediate point thereof so as to prevent leakage of external air through said packing assembly and along said shaft into the interior of said drum.

3. In a rotary vacuum filtering apparatus, said apparatus comprising an essentially fluid-tight closed housing; a conduit shaft extending through opposite walls of said housing; a filter drum disposed within said housing, said filter drum being provided with a pair of opposite outwardly extending trunnions each of which extends through one of said opposite walls of said housing and surrounds said conduit shaft; sealing means between said walls of said housing and said trunnions; means for maintaining said housing under superatmospheric pressure; means for maintaining the region within said drum under vacuum; and a pair of packing assemblies, each disposed around said conduit shaft adjacent the opposite outer ends of said trunnions; the improvement of: means for introducing gas at superatmospheric pressure from within said housing into said packing assemblies.

4. A rotary vacuum filtering apparatus comprising: an essentially fluid-tight closed housing; a conduit shaft extending through opposite walls of said housing; a filter drum disposed within said housing, said filter drum being provided with a pair of opposite outwardly extending trunnions each of which extends through one of said opposite walls of said housing and surrounds said conduit shaft for rotatably supporting said drum; sealing means between said walls of said housing and said trunnions; means for maintaining said housing under superatmospheric pressure; means for maintaining the region within said drum under vacuum; pair of packing assemblies, each disposed around said conduit shaft adjacent the opposite outer ends of one of said trunnions; a pair of lantern rings, one disposed in each of said packing assemblies; a pair of bubble pots mounted exteriorly on said opposite walls of said housing; a level of scrub liquid within each of said bubble pots; a pair of first conduits, each extending from within said housing to within one of said bubble pots below the level of said scrub liquid therein; and a pair of second conduits, each extending in communication between one of said bubble pots and one of said lantern rings for introducing gas from within said housing into said packing assemblies.

5. A vacuum filtering apparatus comprising: an essentially fluid-tight closed housing; a conduit shaft extending through opposite walls of said housing; a filter drum disposed within said housing, said filter drum being provided with a pair of opposite outwardly extending trunnions each of which extends through one of said opposite walls of said housing and surrounds said conduit shaft for rotatably supporting said drum; sealing means between said walls of said housing and said trunnions; means for maintaining the region within said housing and surrounding said drum under superatmospheric pressure; means for maintaining the region within said drum under vacuum; means including a pair of packing assemblies for supporting said trunnions, each of said packing assemblies being disposed around said conduit shaft adjacent the opposite outer ends of said trunnions; a pair of lantern rings, one disposed in each of said packing assemblies; a pair of bubble pots mounted exteriorly on said opposite walls of said housing; a level of scrub liquid within each of said bubble pots; a pair of first conduits, each extending from within said housing to within one of said bubble pots below the level of said scrub liquid therein; and a pair of second conduits, each extending in communication between one of said bubble pots and one of said lantern rings for introducing gas from within said housing into said packing assemblies.

6. In a vacuum filtering process for separating solid material from non-solid material wherein, a slurry of said solid and non-solid material is passed into contact with a filter drum which rotates around a shaft within an essentially fluid-tight closed housing, said shaft extends outside said housing, a packing assembly is disposed around the extended portion of said shaft, the region within said drum is maintained under vacuum, and the region within said housing and surrounding said drum is maintained under superatmospheric pressure, the improvement of preventing leakage of external air through said packing assembly and along said shaft into said filter drum, which comprises introducing gas under superatmospheric pressure from within said housing into said packing assembly at an intermediate point thereof.

7. In a vacuum filtering process for separating solid material from non-solid material wherein; a slurry of said solid and non-solid material is passed into contact with a filter drum which rotates around a shaft within an essentially fluid-tight closed housing, both ends of said shaft extend outside said housing, a packing assembly is disposed around each extended end of said shaft, the region within said drum is maintained under vacuum, and the region within said housing and surrounding said drum is maintained under superatmospheric pressure, the improvement of preventing leakage of external air through said packing assembly and along said shaft into said filter, which comprises introducing gas under superatmospheric pressure from within said housing into said packing assembly at an intermediate point thereof.

8. In a vacuum filtering process for separating solid material from non-solid material wherein a filter drum used in said process is rotatably supported within an essentially fluid-tight closed housing on a pair of trunnions each of which surrounds a shaft which extends through said drum and said housing, a packing assembly is disposed around said shaft adjacent the exterior end of each of said trunnions, the region within said drum is maintained under vacuum, the region within said housing is maintained under superatmospheric pressure, and a slurry of said solid and non-solid materials is passed into contact with said drum while said drum is being rotated, the improvement of preventing leakage of external air through said packing assemblies, along said shaft, and through said trunnions into the interior of said drum, which comprises introducing gas at superatmospheric pressure from within said housing into each of said packing assemblies at an intermediate point thereof.

No references cited.

SAMIH N. ZAHARNA, *Primary Examiner.*